United States Patent
Scheer et al.

(10) Patent No.: US 6,208,648 B1
(45) Date of Patent: Mar. 27, 2001

(54) NETWORK ELEMENT AND INPUT/OUTPUT DEVICE FOR A SYNCHRONOUS TRANSMISSION SYSTEM

(75) Inventors: David Scheer, Ludwigsburg; Jürgen Kasper, Stuttgart; Werner Beisel, Asperg; Wolfgang Krips, Stuttgart, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/029,814

(22) PCT Filed: Jul. 10, 1997

(86) PCT No.: PCT/EP97/04055

§ 371 Date: May 8, 1998

§ 102(e) Date: May 8, 1998

(87) PCT Pub. No.: WO98/01971

PCT Pub. Date: Jan. 15, 1998

(30) Foreign Application Priority Data

Jul. 10, 1996 (DE) .............................................. 196 27 728

(51) Int. Cl.[7] .................................................. H04Q 11/00
(52) U.S. Cl. .............................................................. 370/392
(58) Field of Search .................................... 370/392, 389, 370/251, 252, 254, 229, 428, 412–418, 535, 537, 351, 352, 399, 465

(56) References Cited

U.S. PATENT DOCUMENTS

| 5,210,745 | 5/1993 | Guinand et al. | 370/79 |
| 5,257,261 | 10/1993 | Parruck et al. | 370/84 |
| 5,265,090 | 11/1993 | Guinand et al. | 370/58.1 |
| 5,331,641 | 7/1994 | Parruck et al. | 370/102 |
| 5,428,612 | 6/1995 | Scheffel et al. | 370/84 |
| 5,982,777 | * 11/1999 | Song | 370/537 |
| 5,987,025 | * 11/1999 | Hokasi | 370/535 |

FOREIGN PATENT DOCUMENTS

| 0440128 | 8/1991 | (EP) . |
| 0448020 | 9/1991 | (EP) . |
| 0578315 | 1/1994 | (EP) . |
| 9318595 | 9/1993 | (WO) . |

OTHER PUBLICATIONS

"The Communications Handbook", Ed. by J. Gibson, CRC Press/IEEE Press, 1997, Chap. 39, Synchronous Optical Network (SONET) and Chap. 40, Synchronous Digital Hierarchy (SDH), C. Autry and H. Owen, authors (pp. 542–564).

Network Node Interface for the Synchronous Digital Hierarchy (SDH) ITU–T Recommendation G.707 (Draft), General Aspects of Digital Transmission Systems, Nov. 1995.

"Characteristics of Synchronous Digital Hierarchy (SDH) Multi–plexing Equipment Functional Blocks", Draft Recommendation G.783, Jun. 1990.

MVP Master Processor User's Guide, "Information About Cautions/Related Documentation from Texas Instruments" re TMS 320c80 pp. iii, vi and vii.

* cited by examiner

*Primary Examiner*—Dang Ton

(57) ABSTRACT

The invention concerns a network element and an input-output unit (1) for a synchronous transmission system according to the standard for Synchronous Digital Hierarchy or according to the comparable Synchronous Optical Network (SONET) standard. The input-output unit (1) contains a signal processing device (2) that has a reception data memory (5), a transmission data memory (7), a control unit (6) and a processor (3). The processor (3) is a digital signal processor which essentially carries out the processing of a STM-N signal.

21 Claims, 2 Drawing Sheets

NETWORK ELEMENT AND INPUT/OUTPUT DEVICE FOR A SYNCHRONOUS TRANSMISSION SYSTEM

BACKGROUND OF THE INVENTION

1. Technical Field

The invention relates to a synchronous transmission system, to a network element and to an input/output device.

2. Discussion of Related Art

A synchronous transmission system is, for example, a transmission system for the Synchronous Digital Hierarchy (SDH system). In a SDH system, the signals to be transmitted are combined according to a predetermined pattern and structured in the form of frames. Such a frame is referred to as a synchronous transport module STM-N as described, for example, in the ITU-T recommendation "Recommendation G.707 (Draft) (November, 1995)", e.g. in Chapter 7"Multiplexing Method." In the frame, there is defined a section for control data, i.e. for "Section Overhead SDH" and "AU-n pointer", and a section for message data, i.e. for a "Payload." An overview of the Synchronous Digital Hierarchy is shown in Chapter 40 at pages 554–566 of "The Communications Handbook" edited by Jerry D. Gibson, CRC Press 1997. Also in the same volume in Chapter 39 is described the Synchronous Optical Network (SONET) at pages 542–553. The major differences between SDH and SONET are the terminology and the basic line rates used but the fundamental principles are the same. Therefore, it will be understood that even though most of the discussion and disclosure which follows is in terms of an SDH system, such is applicable to a SONET system as well, but using different terminology and basic line rates.

The SDH system is built up from a number of network nodes which are connected to each other via physical transmission media (e.g., optical fibers, coaxial cables). The network nodes usually consist of groups of individual network elements (e.g., add/drop multiplexers, cross-connects) which are set up to perform various specified functions. The CCITT recommendation "Recommendation G.783", Chapter 2"Transport Terminal Functions", defines the network elements in accordance with basic functions which include, among others, interface functions, monitoring functions and interconnect functions. An interface device provides the interface function for interfacing with the physical transmission medium. In the receive direction, an interface device (SPI, SDH Physical Interface) is capable of recovering the timing signal from the receive signal and recognizing a signal loss (LOS, Loss of Signal), thereby providing the signals LOS, DATA and TIMING (see G.783, FIG. 2.2). In the transmit direction, the interface device is capable of transmitting, among others, a signal using the system timing signal.

The interface devices are generally implemented by combining optical transmit and receive modules and standard components (e.g. TDC2302C from Texas Instruments) or ASIC'S. A standard component of this type has, among others, the following functions: It transmits and receives STM-1 (called STS-3 (electrical)/OC-3 (optical) in SONET) signals with a bit rate of 155.52 Mbits/s. It recognizes the frame of the incoming signal and transmits a Frame Indication Signal. It also provides markers for the states Loss of Signal (LOS) and Loss of Frame (LOF).

Thereafter, the received STM-1 signal is processed further in a signal processing device which is also a standard component (e.g. TDC3003 from Texas Instruments) or an ASIC. This standard component has, among others, the following functions: It has to process the entire overhead. For signals which have been received and for signals which are to be transmitted, the standard component generates, in accordance with an external timing signal, pointers and performs pointer actions. The standard component also performs monitoring functions for the B1, B2 and B3 encoding, for error messaging (Far End Block Error, FEBE) and for counting the pointer actions.

The interface device and the signal processing device form an input/output device which interconnects to other components of the network element, for example with a switching matrix in a cross connect.

Since the network elements have become increasingly more complex and more densely integrated, the complexity of the circuitry and the number of gates of ASIC's has also increased. Consequently, more complex simulations and tests are necessary, resulting in still longer simulation and test times.

SUMMARY OF INVENTION

It is an object of the invention to provide a synchronous transmission system and a network element for a synchronous transmission system wherein the increasingly complex demands are satisfied in a simple manner.

In accord with a first aspect of the invention, a synchronous transmission system for digital signals combined to a multiplex signal, comprising network elements which are connected to each other via one or several transmission media, each network element further comprising an input/output device for receiving and transmitting the multiplex signal, with the input/output device further comprising an interface device and a signal processing device for processing data received from the interface device, is characterized in that the signal processing device comprises memory means for storing the data and a programmable processor, that the memory means is responsive to data and write address signals for arranging the data in a predetermined pattern for access by the processor for processing the data, and that the memory means is responsive to read address signals for conveying to the interface device data received from the processor.

According to a second aspect of the present invention, a network element for a synchronous transmission system, with an input/output device comprising an interface device capable of transmitting a multiplex signal and processing a received multiplex signal, and a signal processing device for processing data received from the interface device, is characterized in that the signal processing device comprises memory means for storing the data and a processor, that the memory means is responsive to data and write address signals for arranging the data in a predetermined pattern for access by the processor for processing the data, and that the memory means is responsive to read address signals for conveying to the interface device data received from the processor.

According to a third aspect of the present invention, an input/output device for a network element in which forms a part of a synchronous transmission system, comprising an interface device capable of transmitting a multiplex signal and processing a received multiplex signal, and a signal processing device for processing data received from the interface device, is characterized in that the signal processing device includes memory means for storing the data and a processor, that the memory means arrange the data in a predetermined pattern so that the processor can access and process the data, and that the memory means can convey to the interface device data received from the processor.

In further accord with these various aspects of the invention, they may be further characterized in that the memory means is for storing the data received from the interface device and from the programmable processor, in such a way that the data are arranged in groups containing data of a respective same type. The synchronous transmission is further characterized in that said access by the processor is for access to each of the groups as a block, wherein block size is variable. The synchronous transmission system is further characterized in that the processor is for rearranging a chronological order of the blocks and for storing the blocks in an internal memory. In still further accord with the first aspect of the present invention, the processor uses a transfer list for accessing the data arranged in groups, wherein the transfer list contains information for transferring data from a data source to a data sink, and that the processor is for recalculating the transfer list each time when the block size changes.

With the present invention, the network elements can advantageously be flexibly adapted to (ITU-T/ETSI) standards while these standards are still under development, without the need for elaborate changes in the circuitry; necessary adaptations can be made quickly. There is no need to develop new complex circuits.

BRIEF DESCRIPTION OF THE DRAWING

The invention is described in the following in form of examples taken in conjunction with the drawings. In the drawings is shown in.

DETAILED DESCRIPTION OF PREFERERRED EMBODIMENTS

Figure 1:
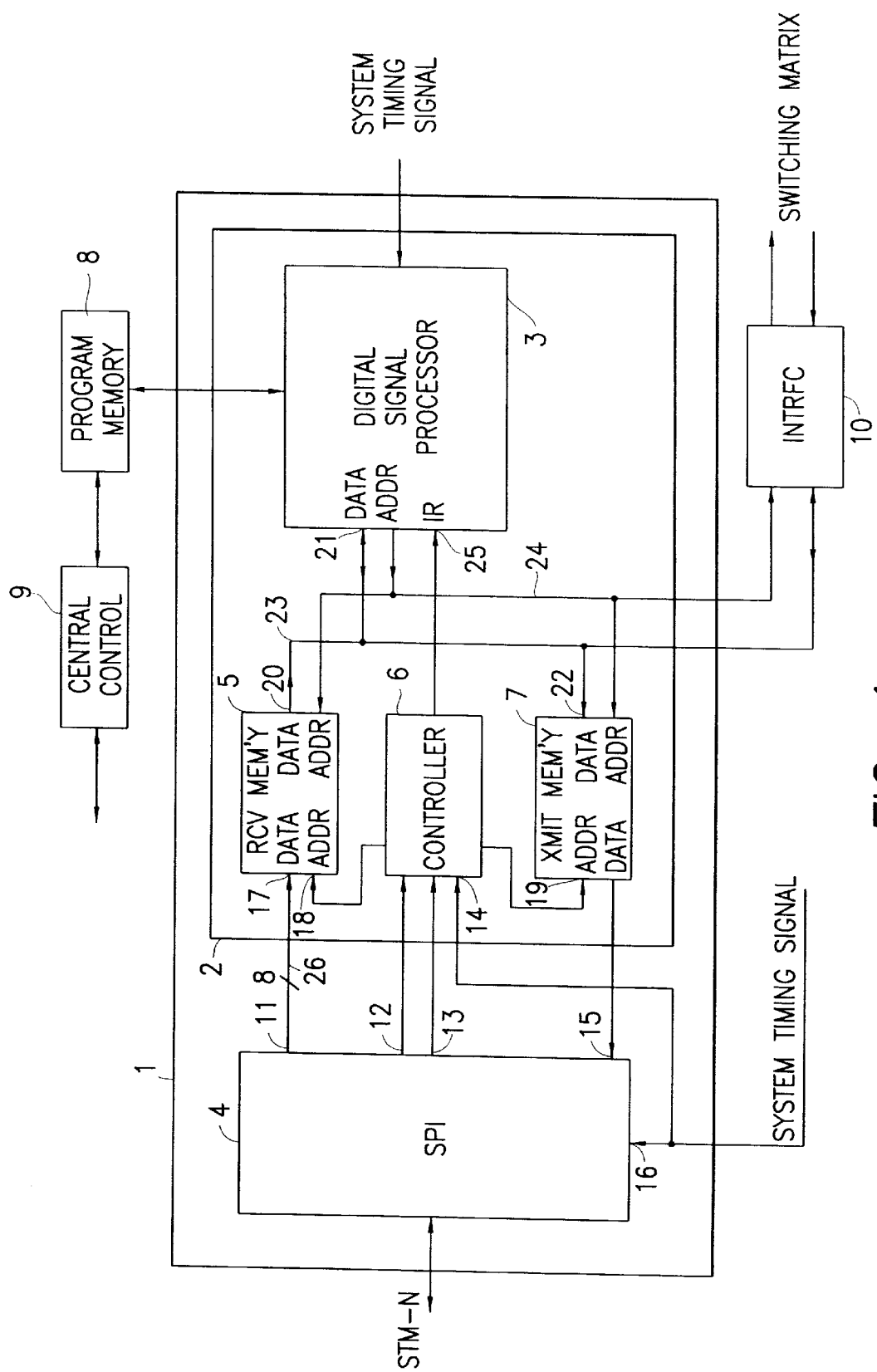
FIG. 1 a block circuit diagram of an input/output device for a network element.

Referring now to FIG. 1, there is depicted an exemplary block circuit diagram of an input/output device 1 for a network element, showing in detail the various components to aid in the understanding of the invention. The network element forms a part of the transmission system for the synchronous digital hierarchy of a SDH system (or a Sonet system). Several network elements can be combined to form a network node which is connected to additional network nodes via one or more physical transmission media. Network elements include, e.g., cross connects, add/drop multiplexers and cable systems. The input/output device 1 of the invention is described with reference to a cross connect for a SDH system, wherein the cross connect includes a switching matrix connected to the input/output device 1.

The input/output device 1 includes an interface device 4 and a signal processing device 2 with a receive data memory 5, a transmit data memory 7, a controller 6 and a processor 3. Also shown in FIG. 1 is an interface 10 which provides a connection to the switching matrix, a program memory 8 and a central control circuit 9, all of which are connected to the input/output device 1, but can also be located remote from the input/output device 1. The program memory 8 is also adapted to store data and to forward messages.

A STM-N (or STS-1 or STS-3xN or STS-3xNc) signal enters the network element and exits from the network element at the interface device 4; the STM-N signal is transmitted and received serially, i.e. the individual bytes of a frame are received and transmitted serially. The interface device 4 has the functionality of the SDH Physical Interface SPI known from the "Recommendation G.783." For this reason, the interface device 4 will be referred to hereinafter as SPI. The transmit data memory 7 and the receive data memory 5 are random access memories (RAM) which are also referred to as write-read memory. The program memory 8 is also a write-read memory, for example a dynamically programmable write-read memory (DPRAM).

In the following, the design of an input/output device 1 will be described first, followed by a description of its functionality. The SPI 4 has a data output 11, an output 12 for a timing pulse derived from the received STM-N signal, an output 13 for a frame identification signal (A1 byte), a data input 15 for data to be transmitted and an input 16 for a system timing signal defined in the network element. The data output 11 is connected to a data bus 26 (8 bit parallel bus) which conveys message data (payload) and control data e.g., section overhead (SOH) to a data input 17 of the receive data memory 5 in the form of bytes. The outputs 12 and 13 are connected to inputs of the controller 6. The system timing pulse can be conveyed to another input 14 of the controller 6. The controller 6 is connected via an address bus to an input 18 of the receive data memory 5 and via an address bus to an input 19 of a transmit data memory 7; memory addresses generated by the controller 6 can be conveyed via these inputs 18, 19: the input 18 receives a write address, whereas the input 19 receives a read address. The write address is usually also referred to as Write Pointer, whereas the read address is referred to as Read Pointer.

The receive data memory 5 has a data output 20 which is connected to a data bus 23. Also connected to the data bus 23 is a data port 21 of the processor 3 and a data input 22 of the transmit data memory 7. The data port 21 of the processor 3 has a data input and a data output, thereby enabling bidirectional data transmission. An address bus 24 is connected to the receive data memory 5, the transmit data memory 7 and the processor 3; via this address bus 24, the processor 3 addresses the receive data memory 5 and the transmit data memory. The data bus 23 and the address bus 24 are also connected to the interface 10 which, as mentioned above, provides the connection to the switching matrix. For example, the data bus 23 is 64 bits wide (8 bytes), whereas the address bus 24 is 32 bits wide (4 bytes).

The controller 6 is connected to an interrupt port 25 of the processor 3, thereby enabling synchronization between the processor 3 and the controller 6. The processor 3 is preferably a digital signal processor DSP, e.g. a TMS32OC80 from Texas Instruments; detailed specifications of this processor are given in the product description. A general description of the operation and programming of digital signal processors is known, for example, from M. Kappelan et al., "Digitale Signalprozessoren (*Digital Signal Processors*)", Funkschau 16/1993 (Part 1, pages 66 –69), Funkschau 17/1993 (Part 2, pages 66–69) and Funkschau 18/1993 (Part 3, pages 136–141).

The following description is based on a STM-1 multiplex signal with a VC-4 payload (3 TUG3) and on the TMS32OC80 and its respective structure. However, a differently programmed microprocessor or a DSP can also be used. As will be understood by those of skill in the art, a comparable discussion for SONET would use comparable terms such as Synchronous Payload Envelope (SPE) instead of Virtual Container (VC), Virtual Tributary (VT) instead of Tributary Unit (TU), etc.

The DSP TMS32OC80 has a central processor (master processor), four parallel processors and a transfer processor (transfer controller) which controls the data transmission between external and internal memories.

Figure 2:
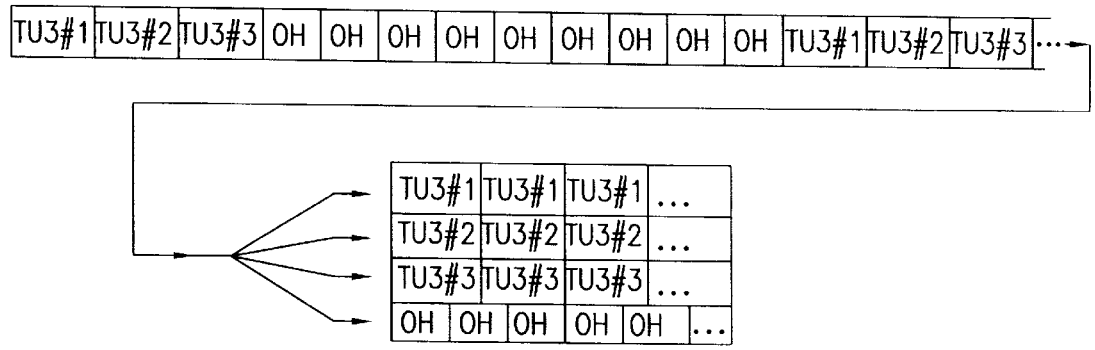
FIG. 2 an illustration describing the formation of a group.

In the following, the operation of the input/output device 1 in the receive direction will be described with reference to FIGS. 2 and 3. The SPI 4 receives the frames of a STM-1 signal with a frequency of 155.52 MHz and executes the functions described above: e.g. deriving the timing pulse and recognizing the frames (A1, A2 bytes). The SPI 4 conveys data, i.e. the overhead and payload bytes of the STM-1 signal, to the data input 17 of the receive data memory 5. In the receive data memory 5, the overhead and payload bytes are arranged in a logical fashion so that four groups are formed, wherein each of the groups contains data of the same type: three groups for the three tributary units TU and one group for the overhead OH (81 bytes). In FIG. 2, an example of the formation of these groups is shown schematically with reference to an exemplary data stream. The individual bytes are arranged from left to right as follows: TU3#1, TU3#2, TU3#3, 9 OH, TU3#1, TU3#2, TU3#3, etc. After the groups are formed, there exists one group for TU3#1, one group for TU3#2, one group for TU3#3, and one group for OH. In this way, each group can be processed individually without requiring data from another group for processing. The signal processing task is thus distributed over four subtasks, and the processor 3 can access contiguous data of the same type. The structuring of the overhead and payload bytes into the four groups transmitted via the data bus 26 is controlled by the controller 6 which generates the memory addresses. For this purpose, the controller 6 for example includes an automatically resetting counter with a range from 0 to 2429.

The access to the data stored in the receive data memory 5 is controlled by the transfer processor located inside the processor 3, wherein the transfer processor accesses the data based on a transfer list which is conveyed to the transfer processor by a central processor which is also located inside the processor 3. In the transfer list, there is defined the address of a processor-internal memory to which the contents of an address of the receive data memory 5 is to be transmitted; the transfer list consequently contains all information required to transmit data from a source to a sink. The transfer list is recalculated continuously, i.e. for each frame.

The central processor is responsible for actually processing the received STM-1 signal; processing of the received data by the four parallel processors is also monitored by the central processor. Signals are processed by a program which is conveyed to the processor 3 by the program memory 8. This program is capable of carrying out all procedures which are necessary to process the received data and to subsequently convey the received data to the interface 10. These procedures include, for example, complete processing of the overhead, generation of pointers, monitoring the operation of the B1, B2 and B3 encoding and counting of pointer actions.

The (external) timing included in an incoming STM-1 signal can be different from the (internal) system timing, i.e. the incoming STM-1 signal and a STM-1 signal to be transmitted are not synchronous. The incoming STM-1 signal is processed with the system timing, so that an address for the write pointer under which a data byte (payload or overhead) is stored, is different from the address for a read pointer from which a data byte is read. Consequently, the data bytes stored in the receive data memory 5 are associated with two different frames of the received STM-1 signal; the A1 byte is therefore not the "oldest" byte stored in the receive data memory 5. Since the data have to be processed in accordance with the order in which the incoming STM-1 signal is received, the transfer processor reads for each group (FIG. 2) the data from the receive data memory 5 in two blocks and rearranges the time sequence of these data so that the data are stored in the internal memory of the processor 3 in the proper order. When all required data are stored in the internal memory of the processor 3, the procedures described above for processing the signals can be applied to the data in the four blocks.

Figure 3A:
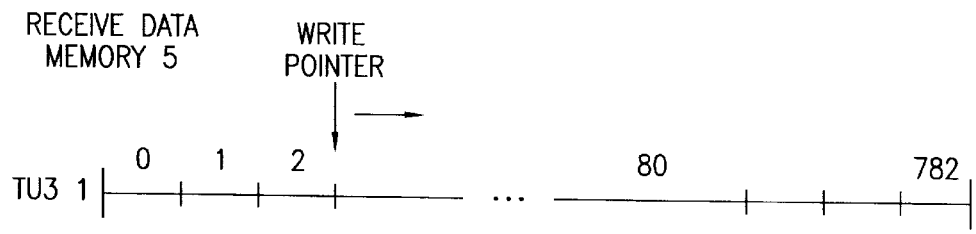
FIGS. 3a–3b an illustration describing the transfer of memory contents.
Figure 3A:
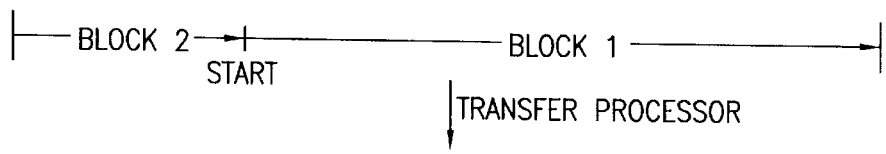
Figure 3B:
Figure 3B:
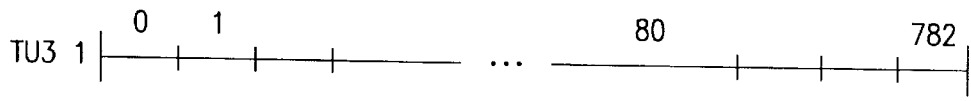

The aforedescribed chronological rearrangement is shown schematically in FIGS. 3(a)–3(b). FIG. 3a shows the linear arrangement of the TU3#1 bytes in the receive data memory 5, with the write pointer pointing to the beginning of the fourth byte. On the right side of the write pointer, there is indicated the first block which has 779 bytes. The second block shown to the left of the write pointer has 3 bytes. The bytes of the first block are part of a frame which was stored first, whereas the bytes of the second frame are part of a subsequent frame. In FIG. 3b, there is depicted the state after the data have been rearranged in chronological order by the transfer processor. This arrangement is also linear, with the 779 bytes of the first block arranged on the left, and the 3 bytes of the second block juxtaposed on the right.

The transfer processor also adapts the timing (multiplexer section adaptation) of the incoming STM-1 signal to the system timing. For each frame, the transfer processor calculates the address (write pointer) under which the data are to be stored in the internal memory, and defines the blocks. The block size can vary by +/–3 bytes, depending on the direction in which the write pointer moves. If the block size has to be changed, then such change is combined with the continuous calculation of the transfer list. The change in block size is then implemented with the next incoming frame.

After each received frame, the filling level of the internal memory of processor 3 is queried; if the filling level exceeds an specified upper limit or dips below a specified lower limit, then a pointer action in the respective tributary unit TU is initiated. A pointer action causes, as is known in the art, more or fewer data to be read out from the internal memory of processor 3. If the columns are rearranged after such a pointer action, then an outgoing frame is generated consisting of four separate data groups in four separate memory areas. The frame is conveyed to the transmit data memory 7. The controller 6, the transmit data memory 7 and the SPI 4 subsequently generate a STM-1 signal for transmission; the STM-1 signal for transmission is generated in the reverse order in which the signal was processed in the receive direction.

The invention has been described with reference to a STM-1 signal, however, without limiting the invention to this specific embodiment. For processing a STM-N signal, the number of blocks has to be increased by the same factor N.

It is evident from the foregoing description that a flexible operating concept is created by processing a STM-1 signal with the processor 3: by loading a different program from the program memory 8 into the processor 3 which is located in the signal processing device 2, changes, e.g. in the ETSI or ITU or Sonet standard, can be implemented without the need for extensive modification of the circuitry.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Synchronous transmission system for digital signals combined to a multiplex signal, comprising network elements which are connected to each other via one or several transmission media, each network element further comprising an input/output device (1) for receiving and transmitting the multiplex signal, with the input/output device (1) further comprising an interface device (4) and a signal processing device (2) for processing data received from the interface device (4), characterized in that the signal processing device (2) comprises memory means (5, 6, 7) for storing the data and a programmable processor (3) for carrying out the processing according to a program, that the memory means (5, 6, 7) is responsive to data and write address signals for arranging the data in a predetermined pattern for access by the processor (3) for processing the data, that the memory means (5, 6, 7) is responsive to read address signals for conveying to the interface device (4) data received from the processor (3) and that the processing is changeable by changing the program.

2. Synchronous transmission system according to claim 1, characterized in that the memory means (5, 6, 7) is for storing the data received from the interface device (4) and from the programmable processor (3), in such a way that the data are arranged in groups containing data of a respective same type.

3. Synchronous transmission system according to claim 2, characterized in that said access by the processor (3) is for access to each of the groups as a block, wherein block size is variable.

4. Synchronous transmission system according to claim 3, characterized in that the processor (3) is for rearranging a chronological order of the blocks and for storing the blocks in an internal memory.

5. Synchronous transmission system according to claim 3, characterized in that the processor (3) uses a transfer list for accessing the data arranged in groups, wherein the transfer list contains information for transferring data from a data source to a data sink, and that the processor (3) is for recalculating the transfer list each time when the block size changes.

6. Synchronous transmission system according to claim 4, characterized in that the processor (3) uses a transfer list for accessing the data arranged in groups, wherein the transfer list contains information for transferring data from a data source to a data sink, and that the processor (3) is for recalculating the transfer list each time when the block size changes.

7. Network element for a synchronous transmission system, with an input/output device (1) comprising an interface device (4) capable of transmitting a multiplex signal and processing a received multiplex signal, and a signal processing device (2) for processing data received from the interface device (4), characterized in that the signal processing device (2) comprises memory means (5, 6, 7) for storing the data and a processor (3) for carrying out the processing according to a program, that the memory means (5, 6, 7) is responsive to data and write address signals for arranging the data in a predetermined pattern for access by the processor (3) for processing the data, that the memory means (5, 6, 7) is responsive to read address signals for conveying to the interface device (4) data received from the processor (3) and that the processing is changeable by changing the program.

8. Network element for a synchronous transmission system according to claim 7, characterized in that the memory means (5, 6, 7) is for storing the data received from the interface device (4) and from the programmable processor (3), in such a way that the data are arranged in groups containing data of a respective same type.

9. Network element for a synchronous transmission system according to claim 8, characterized in that said access by the processor (3) is for access to each of the groups as a block, wherein block size is variable.

10. Network element for a synchronous transmission system according to claim 9, characterized in that the processor (3) is for rearranging a chronological order of the blocks and for storing the blocks in an internal memory.

11. Network element for a synchronous transmission system according to claim 9, characterized in that the processor (3) uses a transfer list for accessing the data arranged in groups, wherein the transfer list contains information for transferring data from a data source to a data sink, and that the processor (3) is for recalculating the transfer list each time when the block size changes.

12. Network element for a synchronous transmission system according to claim 10, characterized in that the processor (3) uses a transfer list for accessing the data arranged in groups, wherein the transfer list contains information for transferring data from a data source to a data sink, and that the processor (3) is for recalculating the transfer list each time when the block size changes.

13. Input/output device (1) for a network element which forms a part of a synchronous transmission system, comprising an interface device (4) capable of transmitting a multiplex signal and processing a received multiplex signal, and a signal processing device (2) for processing data received from the interface device (4), characterized in that the signal processing device (2) includes memory means (5, 6, 7) for storing the data and a processor (3) for carrying out the processing according to a program, that the memory means (5, 6, 7) arrange the data in a predetermined pattern so that the processor (3) can access and process the data, that the memory means (5, 6, 7) can convey to the interface device (4) data received from the processor (3) and that the processing is changeable by changing the program.

14. Input/output device for a synchronous transmission system according to claim 13, characterized in that the memory means (5, 6, 7) is for storing the data received from the interface device (4) and from the programmable processor (3), in such a way that the data are arranged in groups containing data of a respective same type.

15. Input/output devise for a synchronous transmission system according to claim 14, characterized in that said access by the processor (3) is for access to each of the groups as a block, wherein block size is variable.

16. Input/output device for a synchronous transmission system according to claim 15, characterized in that the processor (3) is for rearranging a chronological order of the blocks and for storing the blocks in an internal memory.

17. Input/output device for a synchronous transmission system according to claim 15, characterized in that the processor (3) uses a transfer list for accessing the data arranged in groups, wherein the transfer list contains information for transferring data from a data source to a data sink, and that the processor (3) is for recalculating the transfer list each time when the block size changes.

18. Input/output device for a synchronous transmission system according to claim 16, characterized in that the processor (3) uses a transfer list for accessing the data arranged in groups, wherein the transfer list contains information for transferring data from a data source to a data sink, and that the processor (3) is for recalculating the transfer list each time when the block size changes.

19. The system of claim 1, further characterized in that the processing is a complete processing of the data including processing of payload and overhead.

20. The network element of claim 7, further characterized in that the processing is a complete processing of the data including processing of payload and overhead.

21. The input/output device of claim 13, further characterized in that the processing is a complete processing of the data including processing of payload and overhead.

* * * * *

UNITED STATES PATENT AND TRADEMARK OFFICE
CERTIFICATE OF CORRECTION

| | | |
|---|---|---|
| PATENT NO. | : 6,208,648 B1 | Page 1 of 1 |
| DATED | : March 27, 2001 | |
| INVENTOR(S) | : David Scheer et al. | |

It is certified that error appears in the above-identified patent and that said Letters Patent is hereby corrected as shown below:

Item [75],
After "Wolfgang Krips", cancel "Stuttgart" and substitute -- Leimen -- therefor.

Column 8,
Line 46, (claim 15, line 1) cancel "devise" and substitute -- device -- therefor.

Signed and Sealed this

Twenty-third Day of October, 2001

Attest:

NICHOLAS P. GODICI
Attesting Officer
Acting Director of the United States Patent and Trademark Office